United States Patent [19]

Hutson

[11] 3,836,190

[45] Sept. 17, 1974

[54] SPINNING TOOL FOR UNTWISTING PHONE SERVICE CORDS

[76] Inventor: Lawrence W. Hutson, 1355 3rd St., La Verne, Calif. 91750

[22] Filed: Aug. 8, 1973

[21] Appl. No.: 386,518

[52] U.S. Cl. .................................. 294/118, 294/16

[51] Int. Cl. .................................. B65g 7/12

[58] Field of Search .... 294/1 R, 16, 19 R, 28–31 R, 294/86 R, 106, 118

[56] References Cited

UNITED STATES PATENTS

| | | | |
|---|---|---|---|
| 967,130 | 8/1910 | Jones | 294/118 X |
| 1,468,344 | 9/1923 | Eckert | 294/118 |
| 2,016,356 | 10/1935 | Alberg | 294/118 |
| 2,634,152 | 4/1953 | Dixon | 294/31 R |

*Primary Examiner*—Evon C. Blunk
*Assistant Examiner*—Johnny D. Cherry
*Attorney, Agent, or Firm*—Sellers and Brace

[57] ABSTRACT

A spinning tool for untwisting service cords of desk phones comprising tongs having hooked jaws specially shaped to engage the handpiece and customary finger grip across the rear of the phone housing. The tongs include a swivelling handgrip effective to operate the jaws as the handgrip is raised away from the phone and to open the jaws as the phone is lowered against a support surface. While in use to suspend the phone, the swivelling handgrip permits the phone to be rotated in the appropriate direction to remove twists in the phone service cord.

5 Claims, 3 Drawing Figures

SPINNING TOOL FOR UNTWISTING PHONE SERVICE CORDS

This invention relates to tools, and more particularly to a specially designed spinning tool for use in suspending a desk phone while the phone is being rotated about a vertical axis to remove twists in the phone service cord.

It is well known that desk phone service cords become seriously twisted in normal use, particularly if the phone is transferred from place to place. This undesirable condition is particularly commonplace when a desk phone is equipped with an extra long service cord. It is not unusual for such cords to become so badly twisted that it is difficult to move the phone away from its normal resting place. Attempts to untwist the cord frequently serve only to aggravate an existing serious condition.

Prior proposals have been made for supporting the phone in a manner intended to facilitate untwisting the cord. However, the devices suggested for this purpose are bulky, complex and subject to numerous disadvantages all of which are avoided by the present invention. Thus, the present invention comprises a specially constructed pair of tongs having the outer ends of the jaws connected by linkage means to a swivelling handgrip. The tong jaws are of different lengths and formed with cooperating hooks, one of which is shaped to press the handpiece firmly against the cradle as the longer jaws engage the phone fingerhole crosswise of the rear end of the housing. In this manner the jaws cooperate in holding the phone positively captive and the handpiece firmly seated in its cradle. The phone and tool are then held in one hand as the other is used to rotate the phone about a vertical axis in the appropriate direction to untwist the service cord. This having been accomplished, the phone is lowered against a supporting surface causing the tong jaws to disengage automatically.

Accordingly, it is a primary object of this invention to provide a simple, rugged easily operated spinning tool for suspending a desk phone while rotating it to untwist its service cord.

Another object of the invention is the provision of a spinning tool for a desk phone having a swivelling handgrip operatively connected to specially shaped tong jaws designed to hold the phone handpiece firmly clamped in its cradle while permitting the phone to be rotated.

These and other more specific objects will appear upon reading the following specification and claims and upon considering in connection therewith the attached drawing to which they relate.

Referring now to the drawing in which a preferred embodiment of the invention is illustrated:

Figures 1, 2, 3:
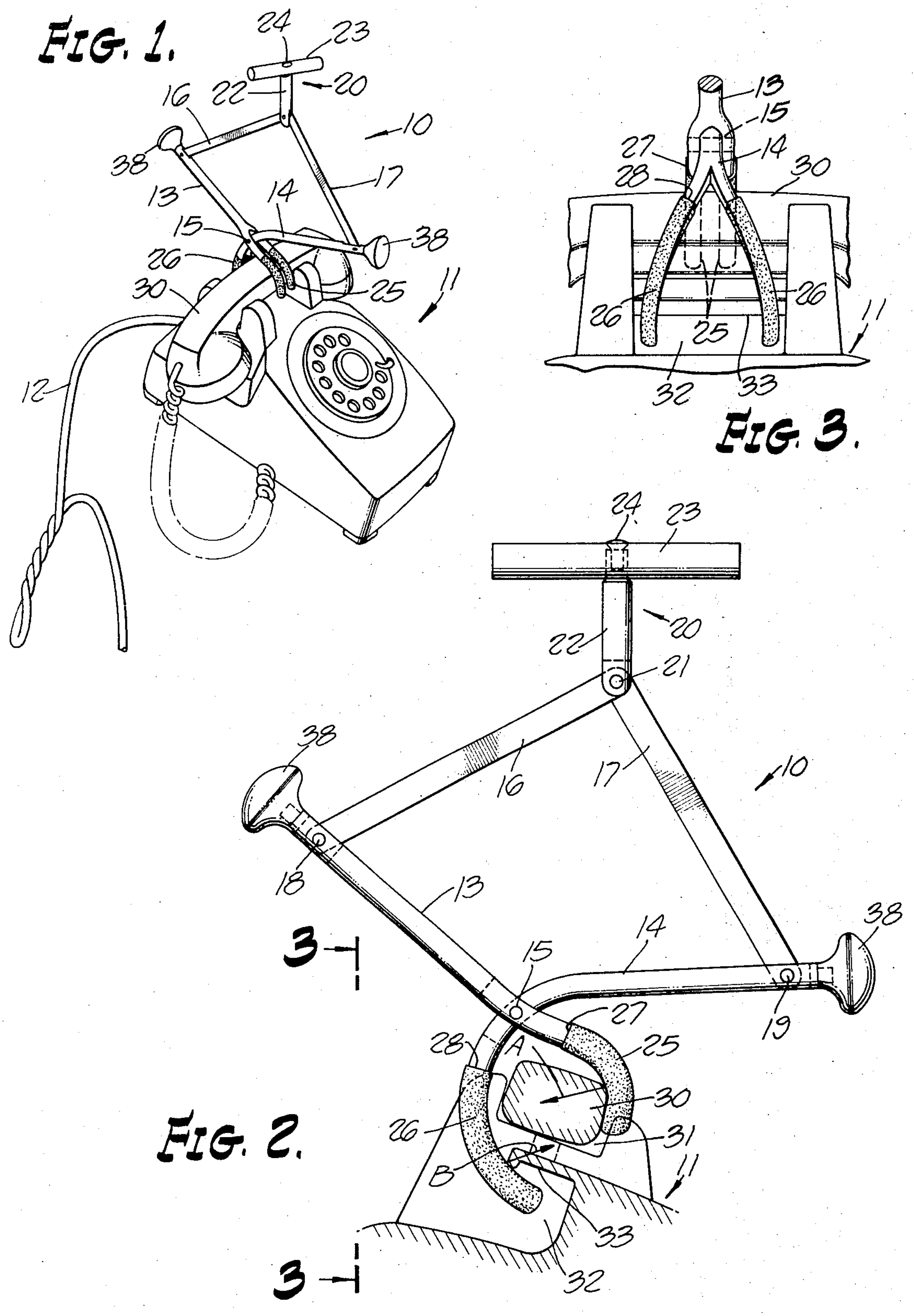
FIG. 1 is a perspective view of a conventional desk phone shown suspended by the invention spinning tool and in readiness to remove twists in its service cord.
FIG. 2 is a fragmentary view similar to FIG. 1 but on an enlarged scale and showing portions of the phone in cross-section.
FIG. 3 is a fragmentary view taken along line 3—3 on FIG. 2.

Referring initially to FIG. 1, there is shown a preferred embodiment of the invention spinning tool, designated generally 10, in use to suspend a conventional desk phone 11 preparatory for use in removing twists from the phone service cord 12. Spinning tool 10 comprises a pair of elongated jaw members 13,14 each shown as having bifurcated or forked ends internested with one another and pivotally connected by a pivot pin 15. A pair of links 16,17 have one end of each pivotally connected to members 13,14 by pivot pins 18,19 and their opposite ends are pivotally connected to one end of a swivelling handgrip 20 by a pivot pin 21. The swivelling handgrip includes a shank 22 held loosely and rotatably assembled to a handle 23 by screw 24. Accordingly, it will be understood that the user may grip handle 23 and then rotate the remainder of the tool about the axis of shank 22.

Jaw members 13,14 have their free ends hooked toward one another in the manner best illustrated in FIG. 2, it being noted that member 13 has a relatively short forked end 25 whereas jaw member 14 has a substantially longer more deeply hooked pair of ends 26. Each of the jaws 25,26 are preferably coated with a thick layer of elastomeric material 27,28 to avoid risk of damage to the surface of the phone components.

Referring to FIG. 2, it will be observed that the tool is shown in use to suspend phone 11 with the shorter jaws 25 embracing the phone handpiece 30 while in its normal position of rest in cradle 31. The free ends of the longer more acutely hooked jaws 26 extend into recess 32 underlying the fingergrip 33. It will be apparent from the foregoing that the weight of the phone, when suspended by the spinning tool 10, causes jaw 25 to press the handpiece 30 against the rear corner of the cradle as indicated by arrow A, whereas jaw 26 exerts an equal but opposite force upwardly from the rear edge of the fingergrip 33 as is indicated by arrow B. It is therefore evident that the phone cannot possibly become dislodged so long as its weight is supported by the spinning tool from the handgrip 23 of the tool.

While the particular spinning tool for untwisting phone service cords herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A desk phone spinning tool for suspending a desk phone to remove twists from the phone service cord thereof, said tool having first and second jaw members pivotally interconnected between the ends thereof, swivelling handgrip means operatively interconnecting said jaw members, the opposite ends of said jaw members being hooked toward one another and of substantially different length, the shorter one of said hooked ends being adapted to engage the phone handpiece and hold said handpiece pressed against the handpiece cradle and the longer one of said hooked ends being adapted to engage beneath the edge of a fingergrip in the phone housing closely adjacent said cradle whereby said phone may be supported and rotated along with said jaw members while suspended from said swiveling handgrip to remove twists from the phone service cord.

2. A phone spinning tool as defined in claim 1 characterized in that at least one of said hooked jaws is relatively broad to provide a secure and stable grip with spaced apart points transversely of the phone.

3. A phone spinning tool as defined in claim 1 characterized in that the longer one of said hooked jaws is forked.

4. A phone spinning tool as defined in claim 1 characterized in that both of said hooked jaws are forked.

5. A phone spinning tool as defined in claim 1 characterized in that said phone-contacting surfaces of said hooked jaws are resilient and relatively softer than said phone-contacting surfaces to safeguard against defacing said surfaces.

* * * * *